(12) United States Patent
Siegel et al.

(10) Patent No.: US 6,709,336 B2
(45) Date of Patent: Mar. 23, 2004

(54) ELECTRONIC GAMING METHOD USING CODED INPUT DATA

(75) Inventors: Mark David Siegel, Fort Worth, TX (US); Andrew John Riggs, Lewisville, TX (US)

(73) Assignee: Radica China Ltd. (HK)

( * ) Notice: Subject to any disclaimer, the term of this patent is extended or adjusted under 35 U.S.C. 154(b) by 52 days.

(21) Appl. No.: 10/042,676

(22) Filed: Nov. 19, 2001

(65) Prior Publication Data

US 2003/0096652 A1 May 22, 2003

(51) Int. Cl.$^7$ ............................................... A63F 13/00
(52) U.S. Cl. ................... 463/43; 463/1; 463/36
(58) Field of Search ............... 463/43, 1, 36, 463/42, 11, 40–41, 7–10; 273/298, 304–308

(56) References Cited

U.S. PATENT DOCUMENTS

| | | | | |
|---|---|---|---|---|
| 5,662,332 A | * | 9/1997 | Garfield ..................... | 273/308 |
| 5,979,941 A | * | 11/1999 | Mosher et al. ............... | 283/67 |
| 6,200,216 B1 | * | 3/2001 | Peppel ........................ | 463/43 |
| 6,398,651 B1 | * | 6/2002 | Yamada ....................... | 463/43 |

OTHER PUBLICATIONS

Definition of Universal Product Code and bar code, The American Heritage Dictionary of the English Language, Third Edition, Houghton Mifflin Company, copyright 1992, pps 1–2.*

* cited by examiner

Primary Examiner—John M. Hotaling, II
Assistant Examiner—Aaron Capron
(74) Attorney, Agent, or Firm—Bingham McCutchen LLP; David G. Beck

(57) ABSTRACT

A gaming device allows a user to scan bar codes and collect character data corresponding to characters and character item data corresponding to character items which affect attributes of the characters. The gaming device allows a user to cause simulated battles between characters. In some embodiments, the characters belong to one of a plurality of character groups which are at war with one another. In some embodiments, gaming devices may communicate with other gaming devices in order to engage in battles between characters corresponding to data stored on the respective gaming devices. In some embodiments, each character within a group has a different combination of attributes, which may include strength, magic and technology. In some embodiments, the same bar codes which include character data or character item data also correspond to commercial products unrelated to characters or character items.

27 Claims, 13 Drawing Sheets

Reference numbers for spec

MONSTER OR ITEM?
To determine if the scan creates a monster or an item, check the UPC's first item number.

| UPC Item number 1 | Collects |
|---|---|
| 0-5 | A Monster |
| 6-9 | An Item |

ELECTRONIC GAMING METHOD USING CODED INPUT DATA

FIELD OF THE INVENTION

This application relates generally to electronic gaming devices and is particularly directed to hand-held gaming devices for simulating battle between virtual creatures.

BACKGROUND OF THE INVENTION

Games which involve battles between imaginary creatures have become very popular. Such games include "Dungeons and Dragons," in which players take on the identity of characters which inhabit a universe similar to that depicted in J. R. R. Tolkein's Lord of the Rings trilogy. Players may assume the identity of human or non-human characters with a variety of attributes such as intelligence, strength, speed, magic, dexterity, etc.

In general, some attributes of characters will have advantages over certain attributes but disadvantages with respect to other attributes. For example, a game may give an advantage to strength over dexterity, to dexterity over speed and to speed over strength. Such a relationship is based upon the familiar "rock, paper, scissors" game. In many games, an attribute will be assigned a number according to the level of the attribute. For example, a character having a strength value of 3 would be weaker than a character with a strength value of 5.

In order to make the game more interesting, the outcome of a battle will depend to a certain extent on chance. For example, the outcome of a Dungeon and Dragons battle is determined by a character's attributes and by the roll of a die. If a character survives a battle, it gains experience points which will increase its chances of further survival.

Commonly, games are conducted under the direction of a "dungeon master" who can interpret complex rules and determine the outcome of battles with reference to a series of guide books which have been published for this purpose.

In recent years, similar games have been introduced for simulated battle in video arcades, on personal computers and on hand-held gaming devices. Many such games include characters and/or attributes similar to those of Dungeons and Dragons. However, in these electronic embodiments, rules stored in a memory take the place of guide books and a processor takes the place of the dungeon master.

Electronic versions of battle games are advantageous in that they do not require an experienced player's participation and allow games to be played at a faster pace which is more exciting to the participants. In addition, players with hand-held devices or personal computers may battle against other players' characters by transmitting signals between the devices over a cable or over a network. An individual player may also stage battles against the processor(s) in the player's own device.

In some such games, data regarding various characters may be scanned or otherwise input. For example, Japanese Patent Publication No. 05-30475, entitled "Card Game Device," discloses a gaming device with a bar code reader for scanning data from gaming cards and a memory for storing these data. The gaming cards are made for use with the gaming device and include "character cards" for fighting, weapon cards, defense tool cards and other item cards for "improving the surviving state." The device includes a microcomputer for staging a mock battle and for making a decision as to which character will be the "offense side" and which will be the "defense side" during battle. However, the player will be competing against a known group of characters, the attributes of which are known in advance.

SUMMARY OF THE INVENTION

According to some embodiments of the present invention, a gaming device includes: a scanner for scanning a bar code corresponding to a product identification; a processor for receiving the bar code from the scanner, for translating the bar code to game data and for determining whether the game data are compatible game data; and a storage medium for storing compatible game data. The game data may include character data. In some embodiments, each character belongs to a particular group. The game data may also include item data for describing items used by characters in a game.

In some embodiments of the present invention, a gaming device includes: a simulated scanner which emits a light; a pressure sensitive switch proximate the simulated scanner; a random number generator which generates a code when activated by the pressure sensitive switch; and a processor for correlating the code with a feature of a game.

In other embodiments of the present invention, a gaming device includes: a case small enough to be held in a single hand of a user; a scanner disposed on a first side of the case, the scanner comprising at least one light-emitting diode configured to read bar codes; a controller disposed within the case, wherein said controller correlates read bar codes to one of a plurality of game data associated with a game; a storage device within the case for storing a set of rules for the game and for storing at least a portion of said plurality of game data; and a coupling device for coupling the gaming device with a second gaming device, the coupling device comprising a transmitter and a receiver.

In still other embodiments of the present invention, a gaming device includes: a scanner for scanning a product identification number of a Universal Product Code, the primary meaning of the product identification number being the identification of a commercial product; processing means for receiving the bar code from the scanner, for assigning a secondary meaning to the portion of the code, the secondary meaning corresponding with a monster belonging to one of a plurality of tribes and for determining whether the monster belongs to a specific tribe of said plurality of tribes, the specific tribe associated with the gaming device; a storage device within the case for storing a set of rules for the game and for storing monster data for monsters belonging to the specific tribe; and a coupling device for coupling the gaming device with a second gaming device, the coupling device comprising a transmitter, a receiver, a first tab configured to fit into a first slot of a second gaming device and a second slot configured to receive a second tab of the second gaming device.

Some embodiments of the present invention include a gaming program stored in a storage medium of a gaming device, wherein the gaming program controls the gaming device to perform the steps of: inputting at least a portion of a code, the primary meaning of the code being the identification of a commercial product; and assigning a secondary meaning to the portion of the code, the secondary meaning being a feature of a game.

Other embodiments of the present invention involve a gaming program stored in a storage medium of a gaming device, wherein the gaming program controls the gaming device to perform the steps of: scanning a product identification number of a Universal Product Code, the primary meaning of the product identification number being the identification of a commercial product; assigning a secondary meaning to the portion of the code, the secondary meaning corresponding with a monster belonging to one of a plurality of tribes; and determining whether the monster belongs to a specific tribe of said plurality of tribes, the specific tribe associated with the gaming device.

Certain embodiments of the present invention include a gaming program stored in a storage medium of a gaming device, wherein the gaming program controls the gaming device to perform the steps of: inputting a portion of a code identifying a commercial product; correlating a game character with the portion of the code; and staging a battle involving the game character according to a pre-defined set of game rules stored within the gaming device.

Other embodiments of the present invention involve a gaming method which includes the steps of: using a sensor of a gaming device to input a portion of a code having a primary meaning assigned by the Uniform Code Council; determining a secondary meaning for the portion of the code; determining whether the secondary meaning corresponds to a compatible game feature; and storing the compatible game feature.

DESCRIPTION OF THE SPECIFIC EMBODIMENTS

I. Game Overview

Figure 1:
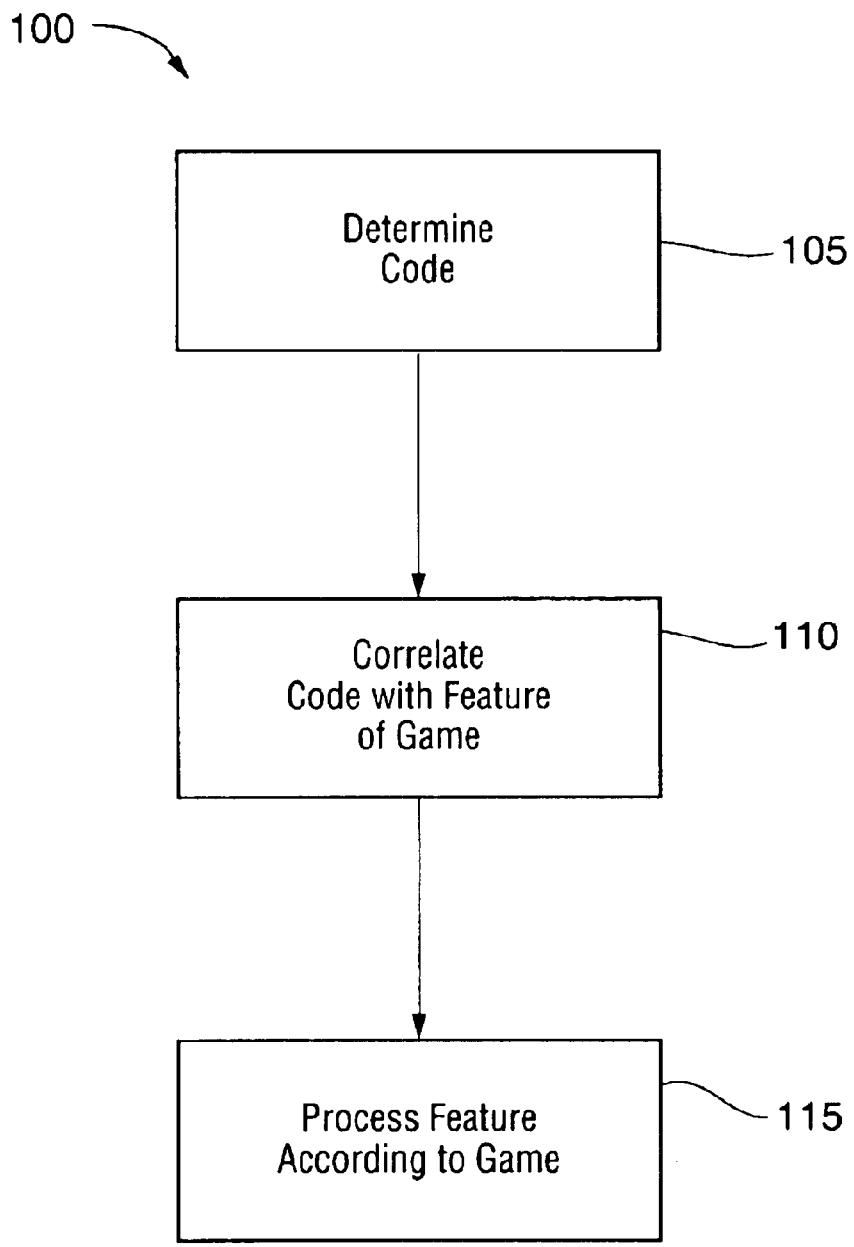
FIG. 1 is a flow chart which provides a high-level overview of various embodiments of the present invention.

Many embodiments of the present invention include games involving the collection of items or characters which are represented by a code. Some such games involve a treasure hunt or similar games in which players attempt to collect items or characters featured in the game. Such items or characters may be referred to herein as "game data," as "features" of the game or the like. Other games involve fighting between characters of the game.

Many of these games involve an element of surprise which is not found in prior art games. In some such games, a player will not know in advance which feature will correspond with a particular code. Only after a user has input the code will the user know whether a desirable or an undesirable feature has been obtained. In some embodiments of the present invention, the codes are derived from bar codes or other codes which were created to serve a purpose which is entirely different from the purpose of the game. For example, in some games, the codes are used to identify products which are unrelated to the game. However, when these codes are input (for example, by scanning a bar code), a user will receive an unknown feature of the game, which may be a desirable or an undesirable feature.

In some embodiments, an element of surprise will result from a random number generator associated with a gaming device. When the user activates the random number generator, it will generate a code which corresponds to an unpredictable feature. In some embodiments, the random number generator is activated by a control on a gaming device. In some such embodiments, the control is a pressure sensitive switch, such as a dip switch, and the random number is activated when the switch is engaged. In some of these embodiments, the switch is connected to a red light which appears to be a scanner and the switch is activated when a user goes through the motions of scanning a code. In alternative embodiments, the user inputs a code and a random number generator correlates the input code with a feature in an unpredictable way.

Some embodiments can involve various types of collaboration between players. For example, in some embodiments a code will correspond with a certain feature. After one player learns that the code corresponds with, for example, a desirable item, that player may share this information with another player. Such information could be freely given or could be exchanged for other desirable information. In some embodiments of the game, a first player who has stored information regarding a character or item can share the information directly with a second player by transferring data from the first player's device to the second player's device. Such a data transfer could take place by directly coupling the devices, by a wireless system such as an infra-red wireless system, by linking the devices with a cable, by local or remote wireless data transfer, via a public or private telephone network, via the Internet or other computer network, etc.

In some embodiments, players exchange information or data for other information or data as a strategic component of playing the game. For example, players can form groups which compete against other groups. Players within a particular group will share all advantageous information or data with other members of their group. Players may also decide to trade information or data with members of competing groups.

Players may play some games alone or against other players. In the single-player modes of some games, players may compete against one or more processors in a gaming device according to gaming programs accessible to the processors. In other games, a single player may attempt to collect certain items or characters in as little time as possible.

Players may compete directly against other players in many games. For example, players may exchange data between 2 or more devices for head-to-head play. This data exchange may be accomplished, for example, by directly coupling gaming devices, by linking the devices with a cable, by local or remote wireless data transfer or other means. Some games are installed on a personal computer or other devices which allow players to compete against one another via communication over a public or private telephone network, over the Internet or other computer network, etc.

II. Playing the Games

Overview

FIG. 1 is a flow chart which illustrates a generalized process of playing various games according to the present invention. In step 105, a code is determined. In step 110, the code is correlated with a feature of a game. In step 115, the feature is used in the game.

According to some embodiments of the present invention, step 105 includes the reception of a code by a gaming device. In some embodiments, the code is received as a result of scanning a bar code. In some embodiments, the code is received in the form of a signal from a radio frequency identification ("RFID") label, such as a Texas Instruments Smart Label™. In other embodiments, the code is received in a variety of ways, including key entry, via data transfer from another gaming device, and via downloading from a network, a personal computer, the Internet, an audio device, a video device and a variety of other sources.

According to some embodiments of the present invention, step 105 includes the step of generating a code. For example, in some embodiments a random number generator generates a code. Such a random number generator may include a processor which is executing any random number generation program known in the art.

In some embodiments, step 110 includes the step of determining a previously-defined correlation between a feature of a game and a code. In some such embodiments, step 110 includes the step of accessing a memory which includes correlations between game features and codes. Such correlations may be stored, for example, in a "look-up table."

In other embodiments, there is no previously-defined correlation between a feature of a game and a code, and step 110 includes the step of assigning a feature of a game to a received code. According to some such embodiments, features are randomly assigned to the code. According to other embodiments, features are assigned to a code depending on an action by the user of a gaming device. For example, in some embodiments a feature is assigned depending on how long an analog control has been activated. In other embodiments, a feature is assigned depending on a prior sequence of commands from the user.

In step 115, a character or item is processed according to the game currently being played. In many games, step 115 includes the step of identifying the feature. In some games, step 115 includes the step of storing a feature. Some features may be processed differently from other features according to the type of feature and the particular game involved. For example, the feature may be stored if it is a desirable feature and deleted if it is an undesirable feature. In some games, a feature may be stored if it is an item or a particular type of character, but may not be stored if it is another type of character.

SKANNERZ™ Game

One embodiment of the present invention involves a game in which the players scan bar codes of arbitrary products to collect data corresponding to monsters or items. According to the story underlying this game, the monsters belong to 3 warring tribes from the planet Kaos. The monsters had developed a technology which transformed monsters into particles called "skannerz." Kaos exploded and scattered the monster's skannerz particles into space. Some of these particles rained down upon the Earth and settled into the bar codes of commercial products.

An Earthling named "Flux" discovered the monster's particles lurking in bar codes and made a device for scanning the codes and collecting the monsters. He also learned that if all the monsters of a tribe are collected in a single device, the monsters will be able to combine their energy and leave Earth. However, only monsters from a single tribe may be collected in any one device. Therefore, Flux created 3 devices, one for each tribe.

Figure 2:
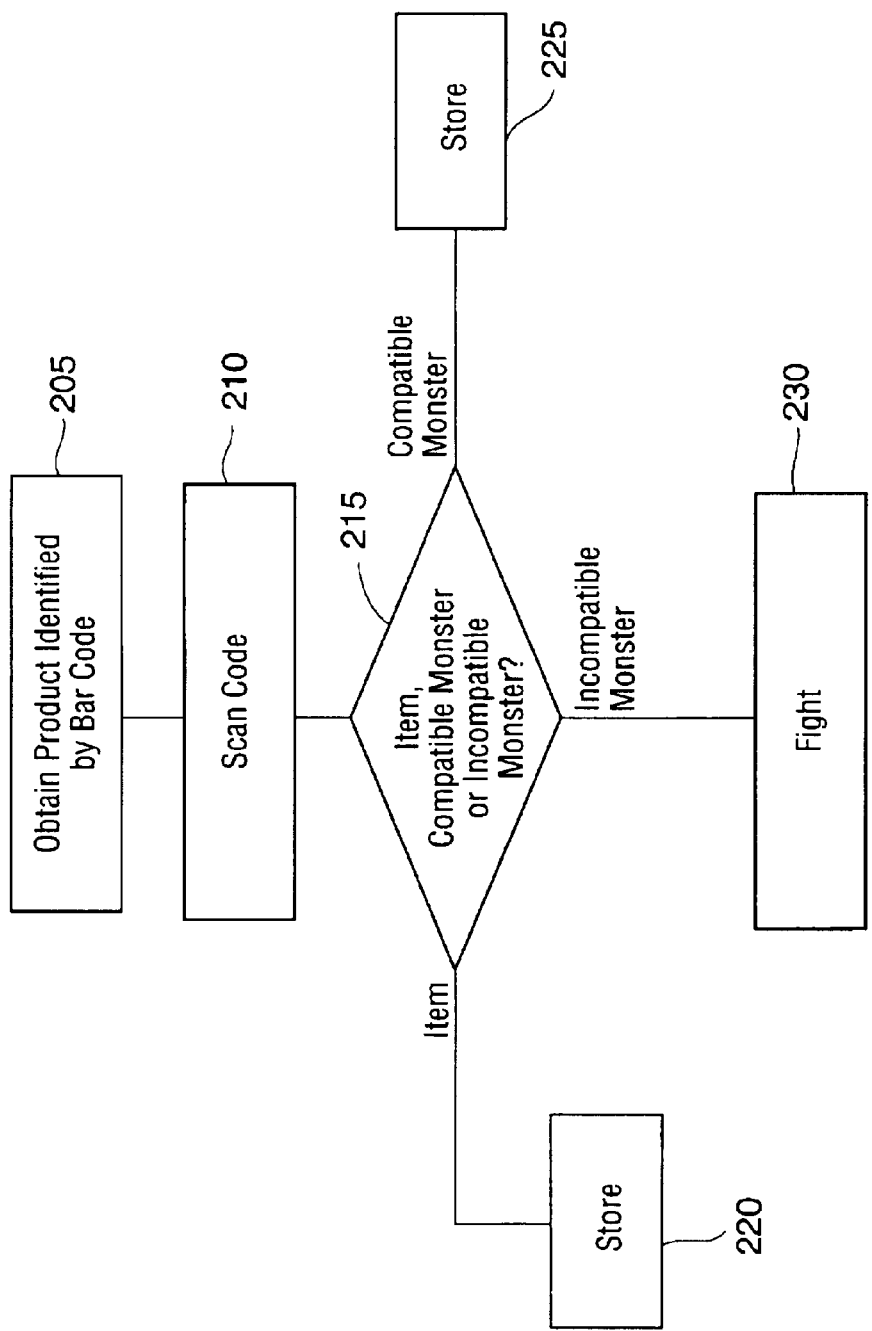
FIG. 2 is a flow chart which provides an overview of one embodiment of a game according to the present invention.

FIG. 2 is a flow chart which illustrates a method of playing this game. In step 205, a user obtains a product bearing a UPC bar code. In one preferred embodiment, the bar code described in step 205 is a UPC code which identifies an arbitrary commercial product. For example, the UPC code could be attached to a garment, a household product from a grocery store, a gardening implement, or any other product. In other embodiments, the product is identified by an RFID label, as described above.

In step 210, the user scans the code. In some embodiments, a scanner within a gaming device scans the UPC code. In other embodiments, an external scanner scans the UPC code and transmits data to a gaming device or another device, such as a personal computer, which is used for playing a game.

In step 215, the gaming device determines whether the UPC code corresponds to an item, a compatible monster or an incompatible monster. A compatible monster is a monster belonging to the tribe for which data may be stored on the gaming device. Any other monster is an incompatible monster. Items affect the attributes of a monster. For example, some items are weapons which give a monster an advantage in battle. Potions are items which can provide an advantage or a disadvantage, but the user will not know which until the potion is used. The players generally do not know in advance which monster or item will correspond with a product's UPC code.

If the bar code corresponds to an item, the gaming device stores the item in step 220. If the bar code corresponds to a monster which is compatible with the device, in step 225 the gaming device stores the monster. If the bar code corresponds to a monster which is not compatible with the device, the gaming device stages a battle with the monster in step 230.

Figure 3:
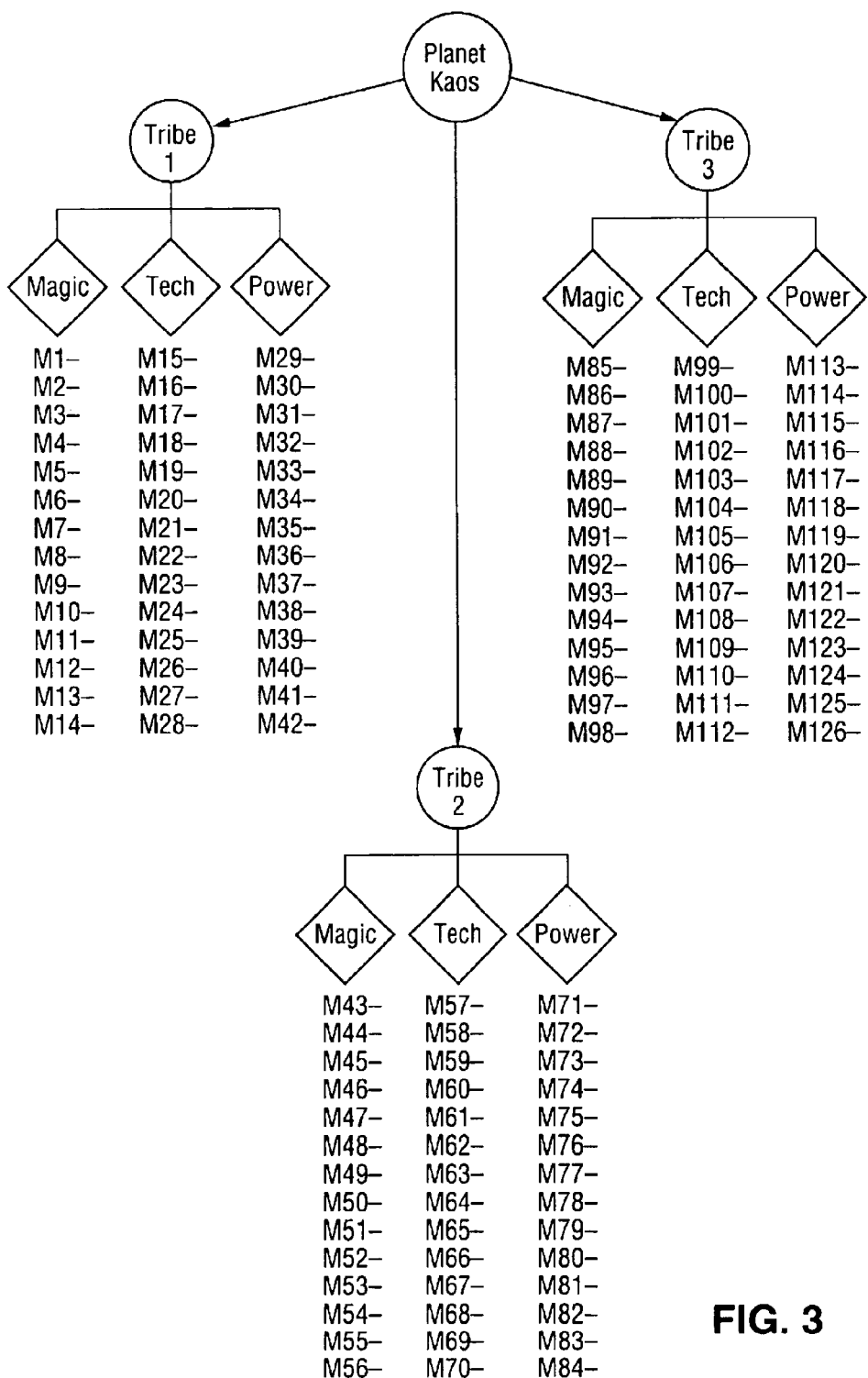
FIG. 3 illustrates the organization of gaming characters according to one embodiment of the present invention.

FIG. 3 is a diagram which illustrates the tribes of monsters from Kaos and the classes of monsters in each tribe. According to this embodiment, there are 3 tribes of monsters, 3 classes within each tribe and 14 monsters in each class. In other embodiments, various groupings of characters and attributes are used. In the present embodiment, each monster has a different appearance, a different name and different attributes.

As noted in FIG. 3, the 3 classes of monsters in each tribe are magic, technology and power. As in the game of "rock, paper, scissors," each class has a natural advantage or disadvantage against another class. In this embodiment, "power" corresponds to "rock," "magic" corresponds to "paper" and "tech" corresponds to "scissors." Accordingly, monsters in the power class have an advantage over monsters in the technology class and a disadvantage with respect to monsters in the magic class. Monsters in the magic class have a disadvantage with respect to monsters in the technology class.

In one preferred embodiment, these relative advantages and disadvantages are manifested by adjusting the damage which is caused by a monster in combat. For example, when a monster in the power class attacks a monster in the technology class, it causes relatively more damage than the same monster causes when attacking another monster in the power class. On the other hand, when a monster in the power class attacks a monster in the magic class, it causes relatively less damage than the same monster causes when attacking another monster in the power class.

Monsters have various attributes, including an unique name and appearance. Some attributes are variable and are determined by a monster's level. Monsters at higher levels have correspondingly higher levels of certain desirable attributes such as hit points, defense rating, speed and attack rating.

Hit points indicate how much damage a monster can withstand before being knocked out. In one embodiment, a monster begins with 10 hit points. When a monster's hit points reach 0, the monster is knocked out. In one embodiment, a monster which is knocked out cannot be selected for battle until it is healed. One method of healing a monster is to enter a code for healing, e.g., by scanning a UPC which is encoded for healing.

A defense rating determines a monster's likelihood of being hit in battle. Higher-level opponents are more likely to be able to hit a monster with the same defense rating. For example, in one embodiment a monster with a defense rating of 1 has an 80% chance of being hit by an attacking Level 1 opponent, a 90% chance of being hit by an attacking Level 2 opponent and a 100% chance of being hit by an attacking Level 3 opponent.

Speed indicates a monster's quickness to respond. In some embodiments, speed is also used to determine which monster goes first in battle.

An attack rating indicates how much damage a monster causes when attacking. The attack rating and other attributes can be modified by items, as set forth in more detail with reference to FIG. 5, and also by gaining experience points in battle.

For each battle a monster wins, it is awarded experience points based on the level of the defeated opponent. In one embodiment, each monster begins with 0 experience points, then gains 5 experience points for defeating a Level 1 monster, 6 experience points for defeating a Level 2 monster and 7 experience points for defeating a Level 3 monster. In one embodiment, a monster with 0 through 100 experience points is in Level 1, with 101 through 299 experience points is in Level 2 and with 300 or more experience points is in Level 3.

Figure 4:
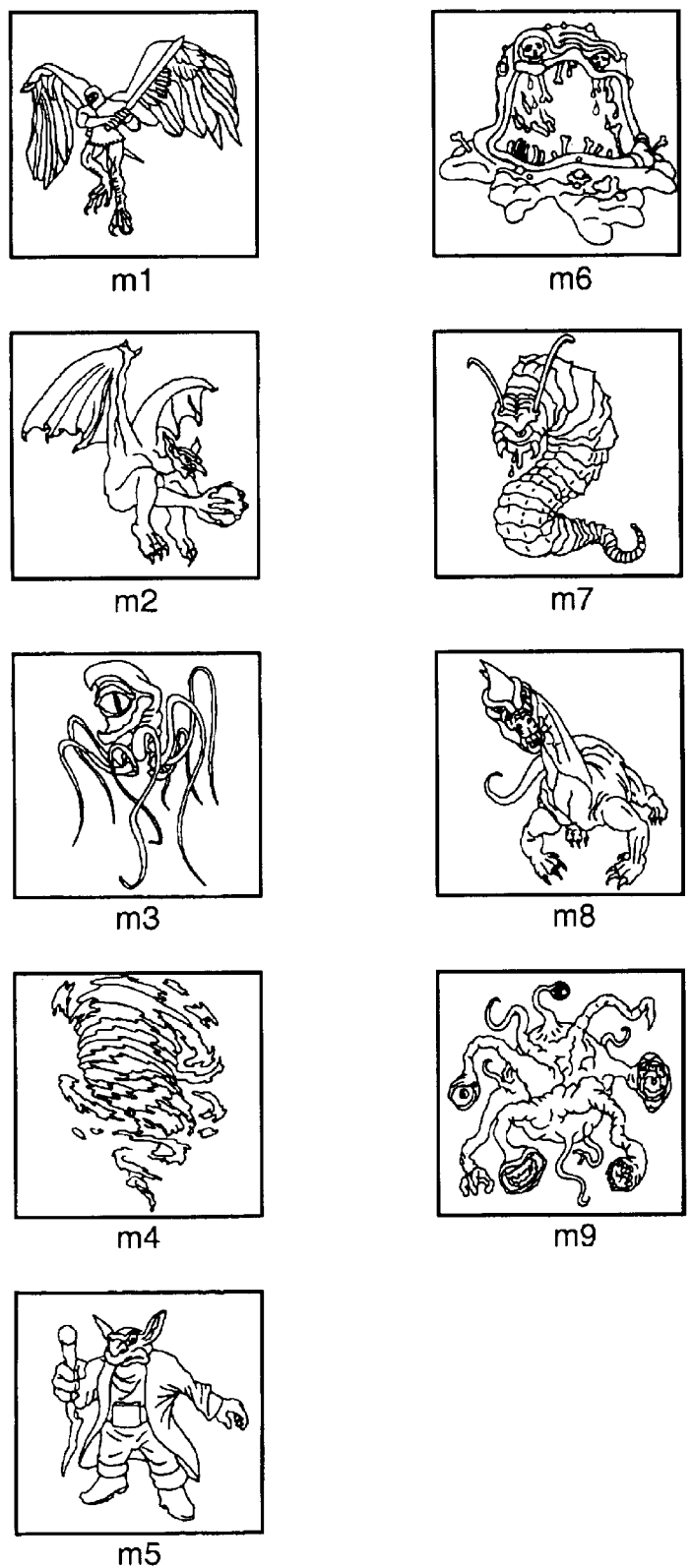
FIG. 4 depicts illustrative gaming characters according to one embodiment of the present invention.

FIG. 4 illustrates monsters M1 through M9 according to one embodiment of the SKANNERZ™ game. In this embodiment, the monsters depicted in FIG. 4 are the first 9 monsters of the magic class of Tribe 1.

Figure 5:
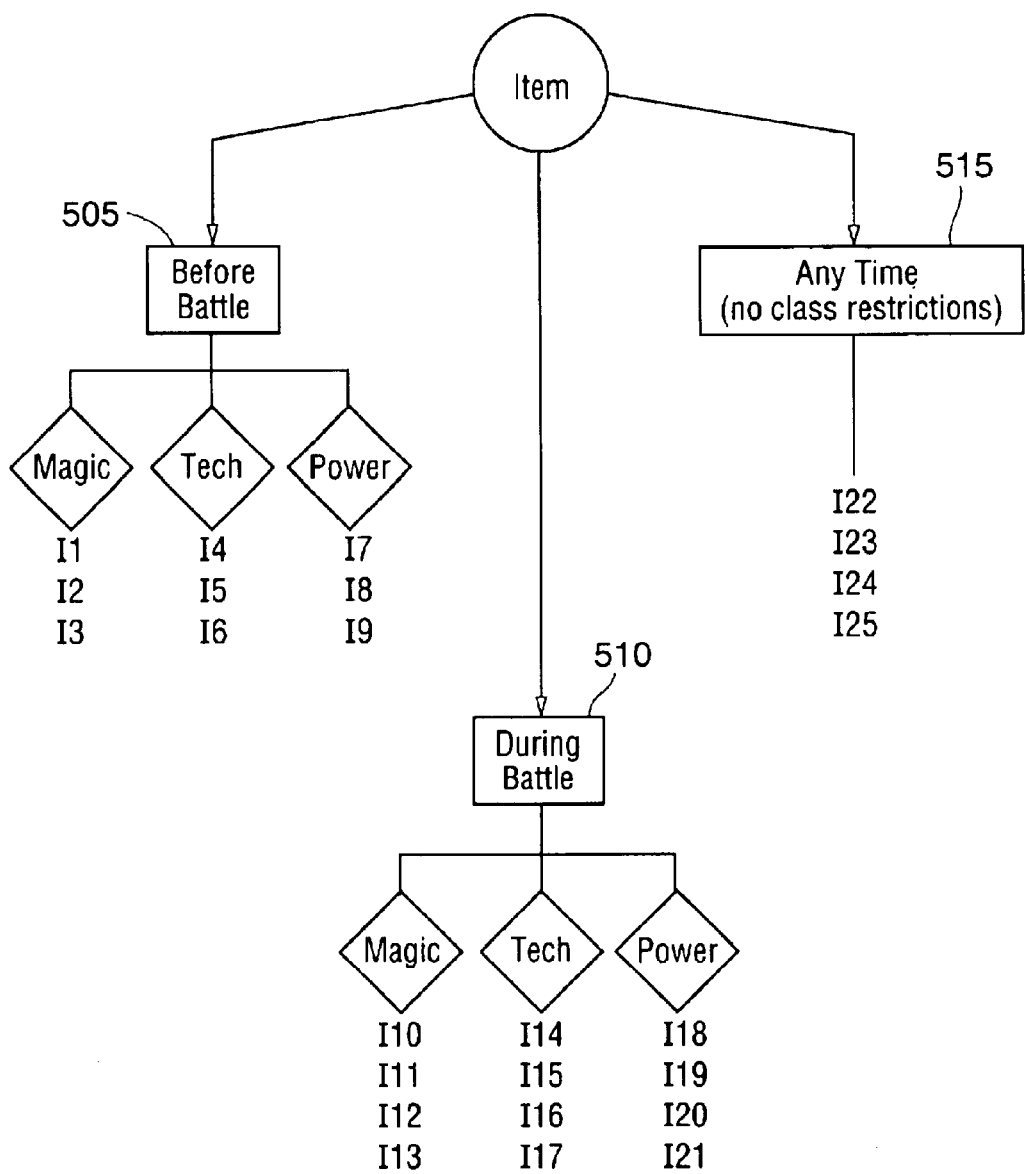
FIG. 5 illustrates the organization of items according to one embodiment of the present invention.

As shown in FIG. 5, in one embodiment of the game, items fall into 3 general categories depending on when the items may be used. For example, items 505 may be used before battle. Items I1, I2 and I3 may only be used by monsters in the magic class. Item I1 is the Ring of Speed, which increases the speed of a monster. Item I2 is the Amulet of Protection, which increases the defensive capability of a monster. Item I3 is the Crystal Ball, which enhances the next attack. Items I4 through I6 correspond to items I1 through I3, except that items I4 through I6 may only be used by monsters in the technology class. Similarly, items I7 through I9 correspond to items I1 through I3, except that items I7 through I9 may only be used by monsters in the power class.

Items 510 are used during battle. Here, items I10 through I13 may be used only by monsters in the magic class. Item I10 is a wand which shoots a magic missile, thereby increasing the amount of damage caused by an attack. Item I11 is a staff which discharges lightning and increases the amount of damage caused by an attack. Item I12 is a sleeping spell which causes an opponent to lose a turn. Item I13 is a spell which causes an opponent to lose a random item. Items I14 through I17 parallel the functions of items I10 through I13, but the former may only be used by monsters in the technology class. Similarly, items I18 through I21 parallel the functions of items I10 through I13, but the former may only be used by monsters in the power class.

Items 515 may be used at any time and by monsters of any class. In this embodiment, items 515 are all potions which may be used only once. Potions may cause beneficial or harmful effects. For example, items I22 and I24 of this embodiment add "hit points" to a monster, thereby increasing its chances of survival during battle. On the other hand, items I23 and I25 take away hit points from a monster, thereby decreasing the monster's chances of survival during battle.

In some embodiments, items are further subdivided into items which may be used by a monster an unlimited number of times and items which only may be used a limited number of times. For example, in one embodiment, weapons which cause an opponent to lose a turn may only be used once.

Figure 6:
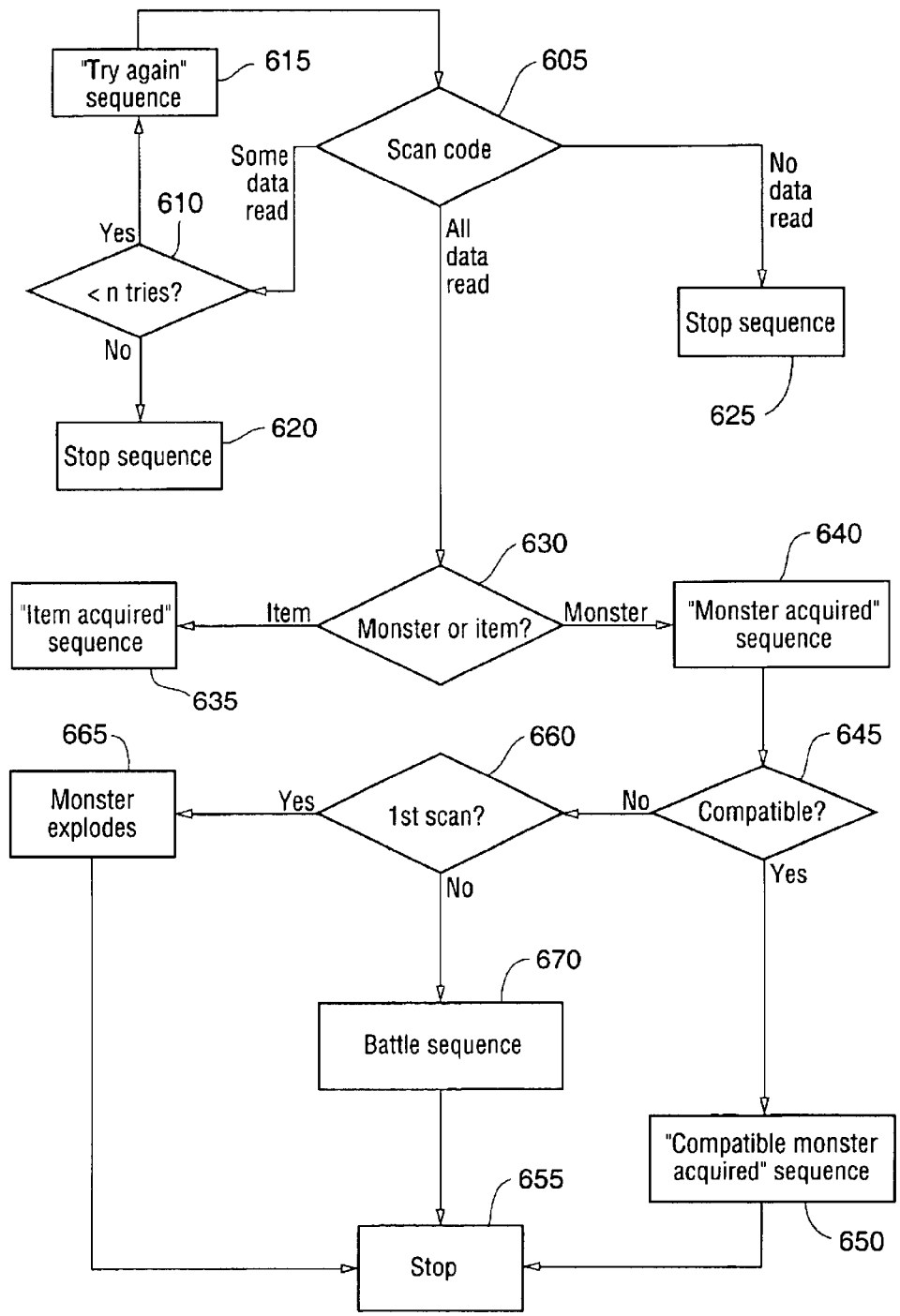
FIG. 6 is a flow chart which illustrates a process of acquiring characters and item data according to one embodiment of the present invention.

FIG. 6 is a flow chart which illustrates a method of acquiring input data according to one embodiment of the present invention. In step 605, a bar code is scanned. If the scanner reads some data but not the entire bar code, the method proceeds to step 610 and it is determined whether the user has tried to scan the code more than a predetermined number of times. If not, the user is prompted to try again in step 615. If so, in step 620 a stopping sequence is displayed and the scanning operation is suspended. If enough data are read in step 605, the game proceeds to step 630 and the data are interpreted. In some embodiments, if no data are read on the first scanning attempt, the method proceeds to step 625, a stopping sequence is displayed and the scanning operation is suspended.

In some preferred embodiments, after the bar code is scanned a graphic is displayed and sounds are produced which simulate a heart monitor recording a heartbeat. The amplitude of the heart beat recorded on the monitor roughly corresponds with the amount of data received during the scan. For example, in step 610, a simulated weak heart beat is displayed and a soft tone is played; in step 630, a strong heart beat is displayed and a louder tone is played; and in step 625, a "flat line" indicating no heart beat is displayed and a continuous tone is played. In some embodiments, the same effect is produced at step 620.

In step 630, it is determined whether the bar code data correspond with a monster or a monster item. If the data correspond with a monster item, the data are stored and an "item acquired" sequence is displayed in step 635. In various embodiments, this sequence may simply be a confirmation that the item will be stored or may include an image and/or a description of the item.

If the data correspond with a monster, in step 640 some form of "monster acquired" sequence is played and a determination is made in step 645 as to whether or not the monster is compatible with the gaming device. For example, in some embodiments a voice is played which states, "Monster acquired!" or the like. If the monster is compatible, a "compatible monster" indication is given and the corresponding monster data are stored in step 650. In some embodiments, a recorded voice states, "Monster is yours!" or makes a similar statement. Then, the sequence ends in step 655.

If the monster is not compatible, the game proceeds to step 660. In some embodiments, an alarm sounds and a siren or similar graphic is displayed. In some embodiments, a voice states, "Enemy monster acquired!" or the like. In some embodiments, if the incompatible monster has been scanned for the first time, the monster will explode in step 665 and the process will terminate in step 655.

In other embodiments, even if the incompatible monster has been scanned only once, the process continues to step 670 and a simulated battle with the incompatible monster will ensue. In some embodiments, an incompatible monster will only be fought if a memory accessible to the gaming device already contains a threshold number of monsters, e.g., 3 monsters. In some embodiments, the incompatible monster will spawn additional monsters which will also engage in battle. After the battle is over, the process continues to step 655 and stops.

Figure 7:
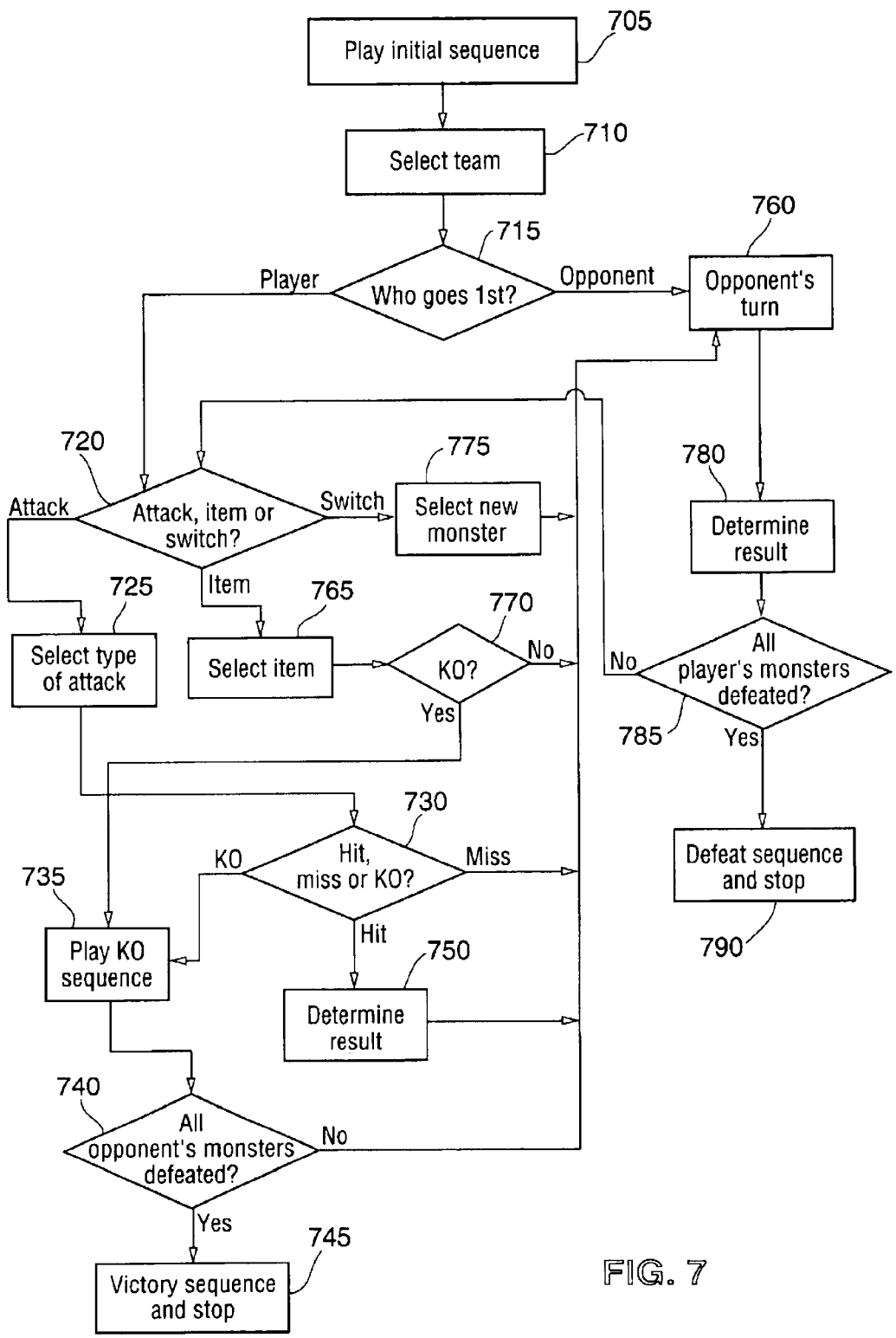
FIG. 7 is a flow chart which illustrates a method of simulating a battle according to one embodiment of the present invention.

FIG. 7 illustrates a battle sequence according to some embodiments of the present invention. This battle sequence could correspond, for example, either to head-to-head battle against one or more opponents or to a single player's battle against a program executed by the player's gaming device. Accordingly, the term "opponent" in FIG. 7 refers to either one or more human or computer opponents.

In step 705, an initial sequence is played. This sequence depends on the circumstances arising at this moment of the game. For example, if an incompatible monster has been input, in some embodiments the sequence displays and plays the word "BATTLE!" If a player has chosen to do battle against the gaming device or against one or more opponents, a sequence appropriate for this selection is played. For example, if the player has chosen to battle another player's monsters, in some embodiments the initial sequence includes a prompt for the player to indicate a mode of communication between the player's gaming device and one or more other devices, which may be gaming devices, personal computers, etc.

In step 710, the player is prompted to determine which of the player's monsters will do battle. In step 715, it is determined whether the player or the opponent will go first. This determination could be made based upon the result of prior battles, upon a particular attribute of one of the battling monsters, upon an item possessed by one of the monsters, upon an outcome of random number generation by a controller, or in any other convenient fashion.

When the player goes first, the player is prompted to choose between attacking, using an item, or switching the monster currently battling on the player's team. Some monsters will have more than one possible type of attack. Therefore, if the player decides to attack, in step 725 the player is prompted to select the type of attack.

In step 730, it is determined whether the attack hit, missed or knocked out the opponent. If the attack knocked out the opponent, a KO sequence is played in step 735, then in step 740 it is determined whether all of the opponent's monsters have been knocked out. When all of the opponent's monsters have been knocked out, in step 745 a victory sequence is played and the battle ends. If all of the opponent's monsters have not been knocked out, the battle sequence proceeds to step 760 and it is the opponent's turn.

The steps indicated in FIG. 7 are from the perspective of a single player who is viewing a single device. Therefore, in step 740, if the player is battling the monsters of a human opponent, a defeat sequence would also be displayed to the opponent.

In some embodiments, the monsters can be killed. However, in the battle sequence depicted in FIG. 7, monsters can only be knocked out, then may be revived by each contestant. One method of reviving a monster is to select "Heal" from a menu, select a monster to be healed, then scan a bar code which will revive the monster.

If the player's attack hit the opponent's monster but did not knock it out, the damage caused by the attack will be evaluated and displayed in step 750. In many embodiments, the attack will be evaluated based on the number of hit points which the opponent's monster possessed prior to and after the attack. As noted above, the strength of an attack will depend on various factors, including but not limited to the classes of monsters doing battle, the level of each monster and the effect of items used by the attacking monster. The battle sequence then proceeds to step 760, the opponent's turn. Similarly, when the player's attack misses, the game proceeds to step 760.

When the player chooses "item" when prompted in step 720, in step 765 the player will select which item to use. In step 770, it is determined whether the item knocked out the opponent's monster. If so, the game proceeds to step 735 and the KO sequence is played. If not, the effect of the item is displayed and the game proceeds to step 760.

If the player chooses "switch" in step 720, the player is prompted to select a new monster in step 775. In this embodiment, when the player selects a new monster instead of attacking, the player loses a turn and the game proceeds to step 760.

In step 760, the opponent is presented with the same choices that have been described above for the player with respect to steps 720, 725, 765 and 775. In step 780, a result will be determined and displayed, according to the choice made by the opponent. For example, an audio clip may be played and a graphic displayed indicating that the player's monster has been hit, has been missed, has lost a certain number of hit points and/or has been knocked out. In step 785, it is determined whether all of the player's monsters have been knocked out. If all of the player's monsters have not been knocked out, the game proceeds to step 720 and it is the player's turn. If all of the player's monsters have been knocked out, in step 790 a defeat sequence will be played to the player and the game will end. If the opponent is a human opponent, the opponent's gaming device will play a victory sequence.

III. Gaming Devices

Figure 8:
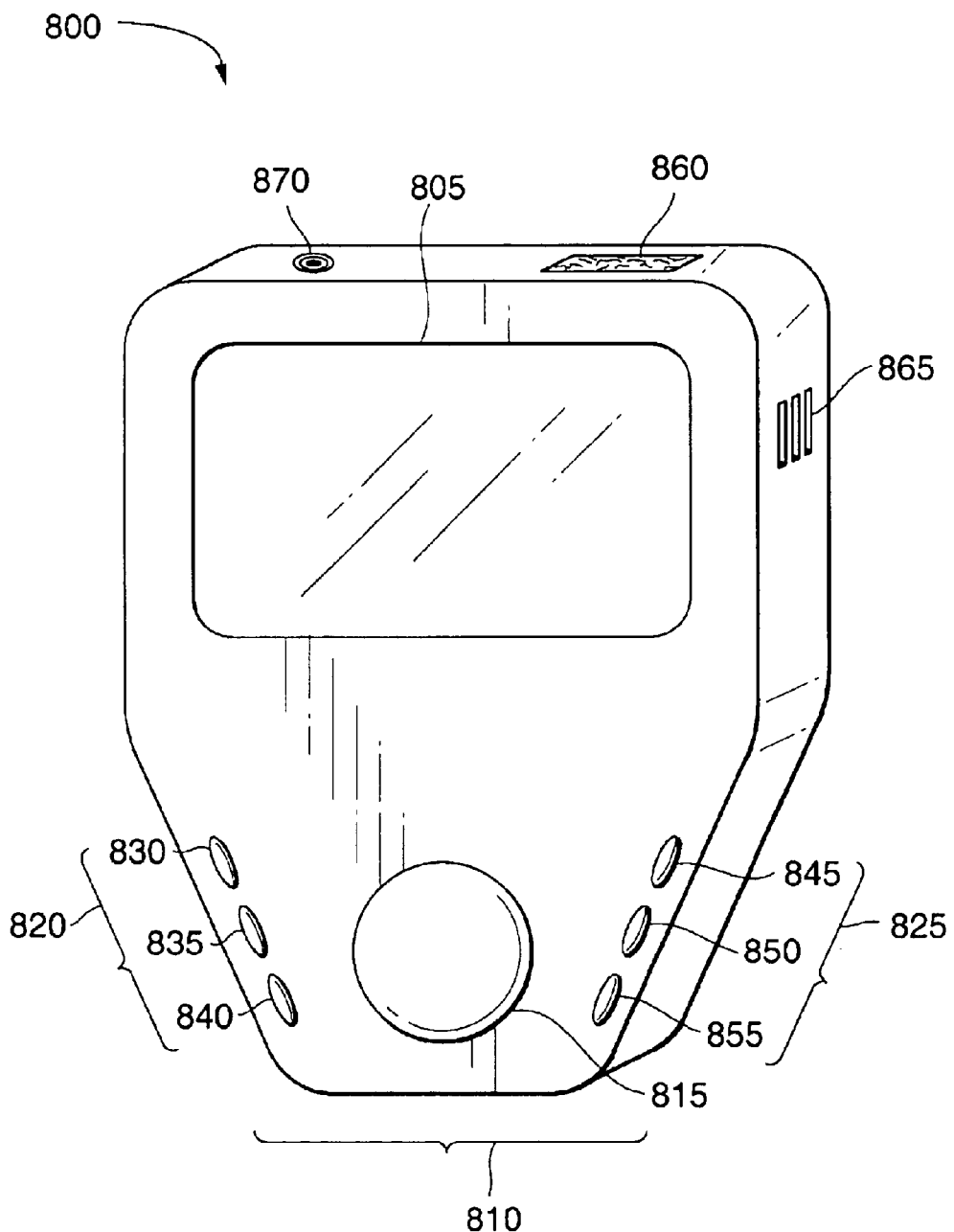
FIG. 8 is a perspective view of one embodiment of a gaming device according to the present invention.

FIG. 8 illustrates one embodiment of gaming device 800 according to the present invention. Display 805 includes a screen such as a liquid crystal display for displaying graphics, menus, etc., according to the selections of a user from controls 810 and to the particular game being played.

In this embodiment, controls 810 include hat button 815 and button zones 820 and 825. Gaming device 800 also features sensor 860, speaker 865 and communication port 870.

Hat button 815 allows a player to move a cursor or similar element to various positions within display 805 in order to scroll through a menu or otherwise interact with gaming device 800. In the embodiment shown in FIG. 8, hat button 815 allows the user to move a cursor up, down, left or right. In other embodiments, hat button 815 is replaced by a multivalue generator, often referred to as a thumb ball control, and can be an analog multi-axis controller, a proportional multi-axis controller or a similar device. The multivalue generator can use Hall effect sensors, optical sensors, or other types of sensors. In alternative embodiments, hat button 815 is replaced by a conventional four switch digital pad that generates or interrupts a signal when a contact is closed or opened and can be configured to generate only four primary directions or generate four primary directions plus four intermediate directions.

Preferably, button zones 820 and 825 include digital buttons. Button zones 820 and/or 825 may include one or more analog buttons which output a value corresponding to the amount of force applied by the user or the length of time the button is depressed by the user. Preferably, such analog buttons use force sensitive resistors and elastomeric materials as are well known in the art.

Buttons 830 through 855 may be assigned in various ways. In one embodiment, button 830 is an on/off button, button 835 is a "back" button which takes a user to a previous screen or selection, button 845 is an "enter" button for making a selection from a choice shown on display 805, button 850 controls sensor 860 and buttons 840 and 855 are used for interactive play during a game, e.g., during a battle.

Sensor 860 allows data to be input for use in a game or otherwise. In one embodiment, sensor 860 is a bar code reader. In an alternative embodiment, sensor 860 is a radio frequency sensor for detecting input from RFID labels.

Speaker 865 provides sound effects to the user in order to create a more exciting gaming experience. For example, in one embodiment, speaker 865 provides the sounds described above with reference to FIGS. 6 and 7.

Communication port 870 allows data to be transferred to or from gaming device 800. For example, communication port 870 allows gaming device 800 to transmit signals to and from another gaming device, a personal computer, or another device. Depending on the configuration of communication port 870, these transmissions may be sent and received via direct coupling of one gaming device with another, via twin-lead wires, via coaxial cable, via a wireless connection (for example, an infrared wireless connection) via a network such as a telephone network or via other means known in the art. In some embodiments, gaming device 800 is coupled to an opponent's gaming device via communication port 870 for head-to-head play against the opponent, as described above.

Figure 9:
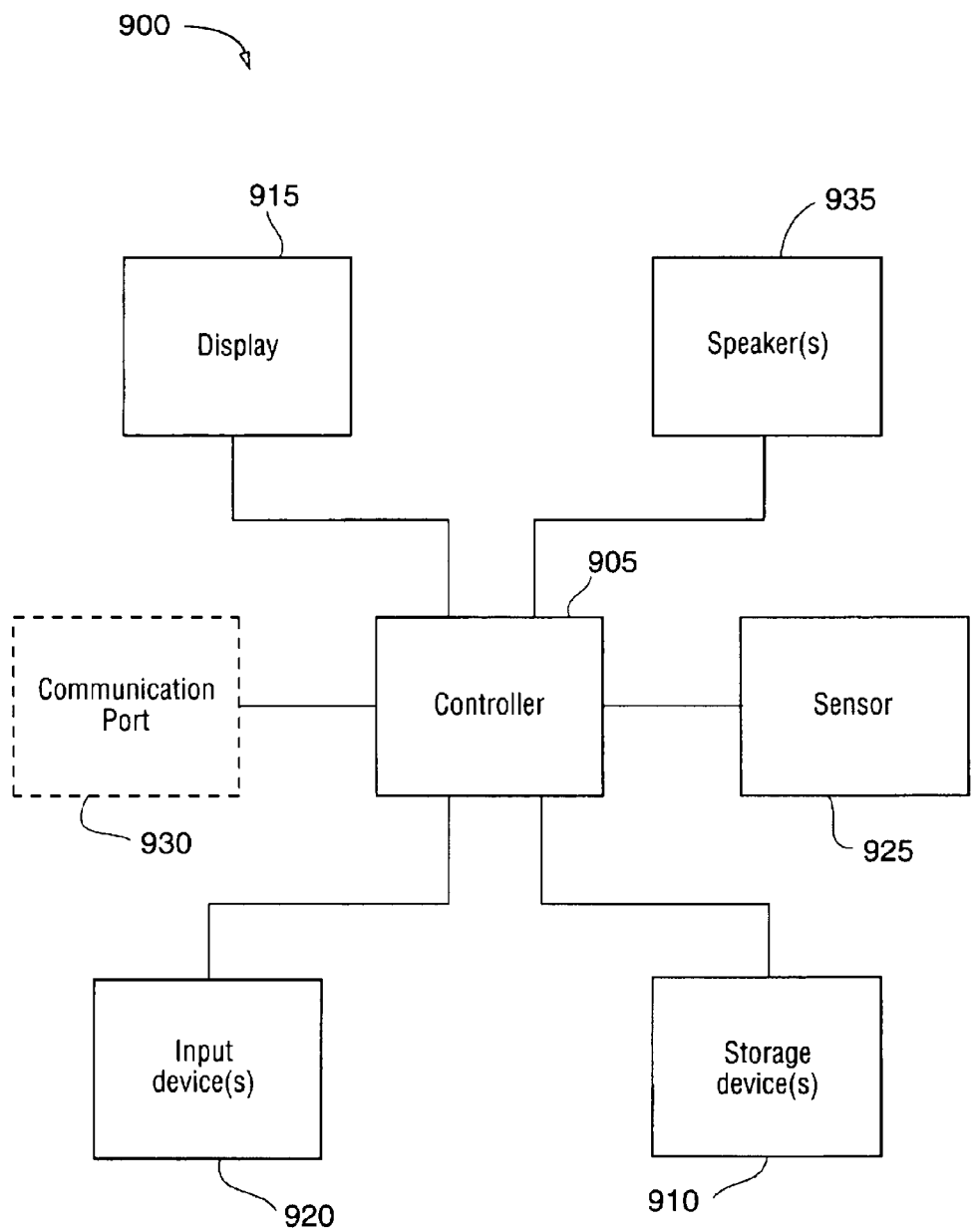
FIG. 9 is a block diagram which illustrates a generalized view of the control system of a gaming device according to some embodiments of the present invention.

FIG. 9 depicts a simplified version of control system 900 for various gaming devices according to the present invention, such as gaming device 800. At the heart of control system 900 is controller 905, which typically includes one or more processors and related hardware and firmware (for example, BIOS and a CMOS chip) and is normally controlled by a software program which is customized for a particular game. Such a game program may reside, for example, on storage device 910.

Controller 905 controls display 915 and speaker 935 according to input from various sources, including the game program, instructions from a user via input devices 920, signals from sensor 925 and signals from optional communication port 930. For example, controller 905 controls display 915 and speaker 935 according to input from sensor 925 and a gaming program when executing the data input procedure described with reference to FIG. 6. Controller 905 controls display 915 and speaker 935 according to input from communication port 930, instructions from input devices 920 and instructions from a gaming program when executing the battle sequences described with reference to FIG. 7.

Storage device 910 may be any storage device which is convenient for the particular embodiment. For example, for hand-held gaming devices storage device 910 preferably includes one or more solid state memory devices such as RAM chips. In some embodiments, storage device 910 is part of controller 905.

Display 915 may be any convenient display such as an LCD screen. In one embodiment, display 915 corresponds to display 805 of gaming device 800. Input devices 920 may include a key pad, a mouse, a joy stick, a steering wheel, or controls such as controls 810 of gaming device 810.

Sensor 925 corresponds with sensor 860 of gaming device 800 and in one embodiment includes a bar code reader. In an alternative embodiment, sensor 925 is a radio frequency sensor for detecting input from RFID labels.

Figure 10:
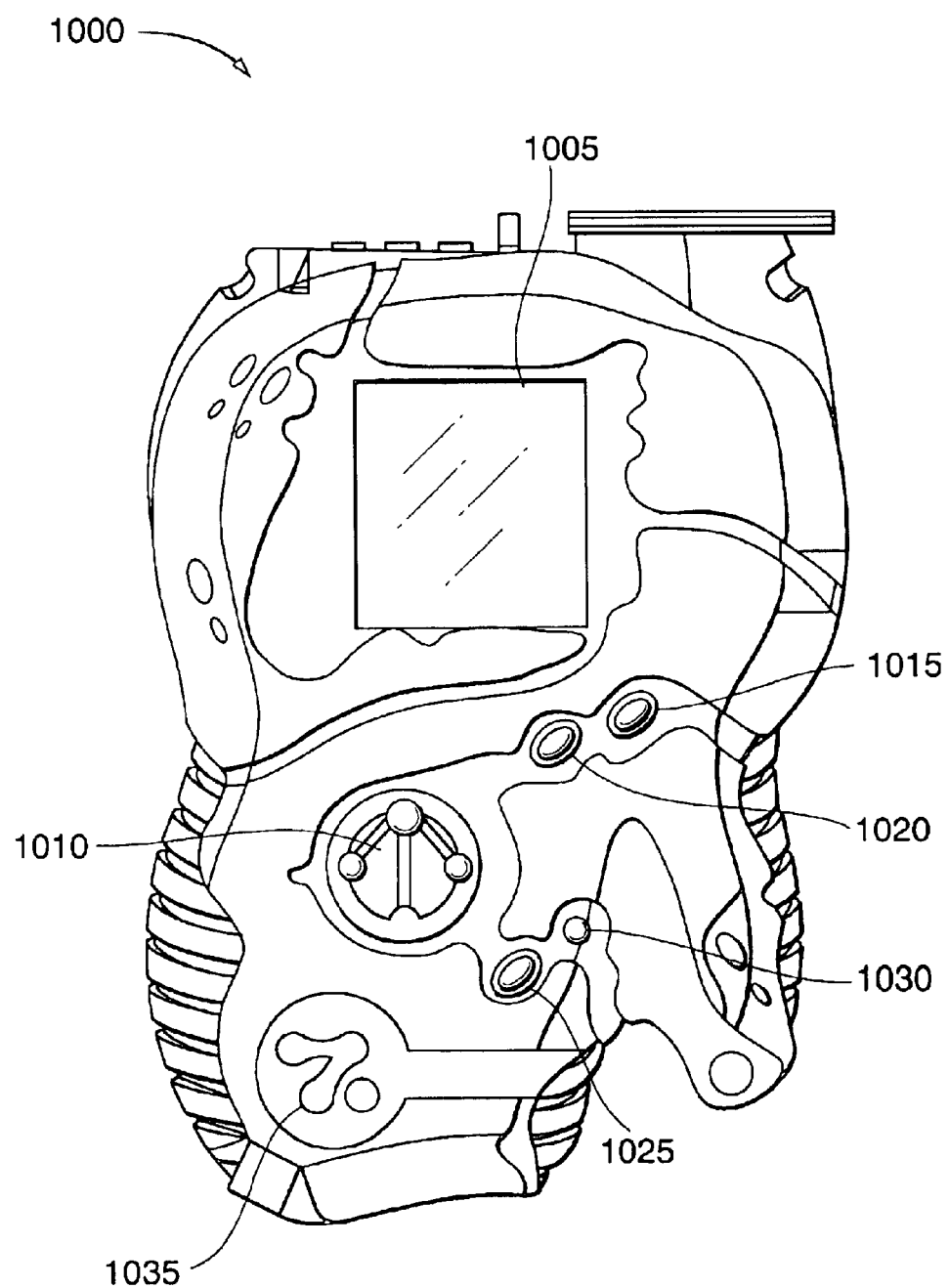
FIG. 10 is a top view of a second embodiment of a gaming device according to the present invention.

FIG. 10 illustrates an embodiment of gaming device 1000, which includes screen 1005 for displaying monsters, menus and other information. In this embodiment, directional pad 1010 is a four-way button which allows a user to scroll through objects depicted on screen 1005, such as menus, stored monsters and stored items.

On/A button 1015 allows a user to turn on the controller and to make selections: on/A button 1015 provides some of the functions of an "enter" key. When user selects a monster, on/A button 1015 allows a user to display information about the monster. B button 1020 permits a user to back out of any selection to a previous screen.

When a user has selected a monster and then pressed pan button 1025, directional pad 1010 allows a user to pan across a monster pictured in screen 1005.

Reset button 1030 resets the controller to its original settings. In some embodiments, pressing reset button 1030 causes all monster and item data to be erased.

In one embodiment, gaming device 1000 is one of 3 gaming devices used in the SKANNERZ™ game for collecting monsters and staging battles between monsters. According to one such embodiment, gaming device 1000 features logo 1035 and is colored blue. In various embodiments, the exterior of gaming device 1000 is made of a range of materials, including ABS plastic, polycarbonate and various metals.

In other embodiments, there are different numbers of gaming devices and gaming devices with different configurations. Although it is not necessary for the gaming devices to include colors or logos to identify them with a group of characters, such clear means of identification are advantageous, particularly for younger players or other players with limited reading ability.

Figure 11:
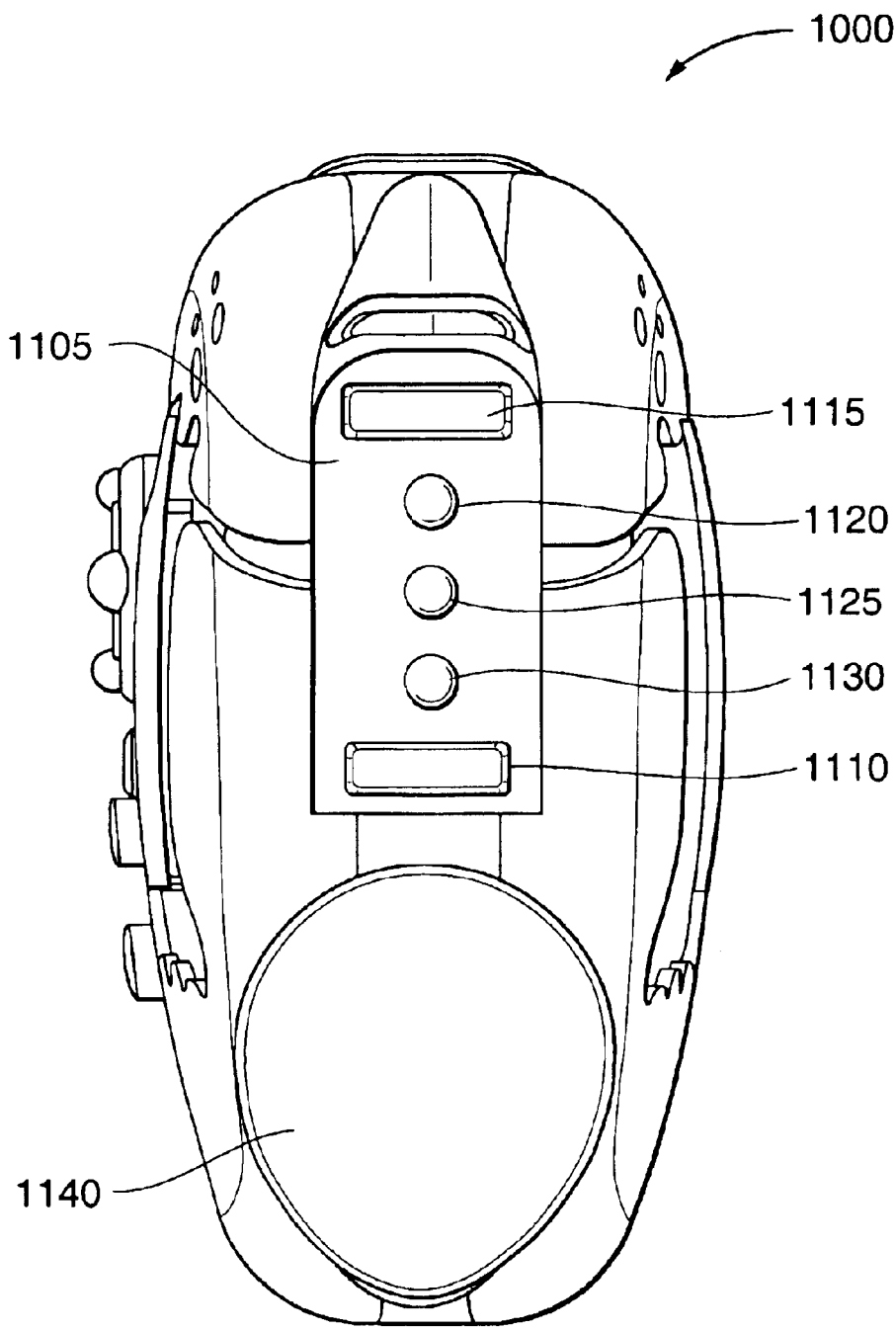
FIG. 11 is an end view of the second embodiment of a gaming device according to the present invention.

FIG. 11 is an end view of gaming device 1000 which illustrates coupling device 1105 and scanning port 1140. In this view, the controls described with reference to FIG. 10 are on the left side of gaming device 1000.

In this embodiment, coupling device 1105 includes tab 1110, slot 1115 and spring-loaded pressure contacts 1120, 1125 and 1130. Tab 1110 of gaming device 1000 is configured to fit into slot 1115 of a second gaming device. When gaming device 1000 is coupled to a second gaming device, contact 1120 transmits data to the second device, contact 1125 is a ground and contact 1130 receives data from the second device.

In other embodiments, a variety of devices are used to allow a user to interact with another user for battling, for other types of competition or for collaboration with another user. For example, hand-held devices may communicate via a cable, a wireless network, a public or private telephone network, the Internet, or via local infra-red transmission and reception. Other embodiments include a scanning device used as a peripheral to a personal computer, which may then be networked with another personal computer via any known means, for example, a local area network, wide area network, the Internet, etc. Scanned data may be stored on a memory accessible to the personal computer.

Scanning port 1140 allows a user to scan data from bar codes. As described above, in one embodiment the bar codes are UPC codes for commercial products unrelated to the game and a controller correlates these data to monster data and monster item data. In one preferred embodiment, an economical version of scanning port 1140 includes a light sensor and 2 light-emitting diodes placed at an angle, such that incident light illuminates the sensor. For accurate scanning, the Sensor needs a focused beam with a small aperture in order to read a short, sharp and fast transition between a dark bar and a light bar of the bar code. On one preferred embodiment, the small aperture is formed by covering the sensor with a pin hole cover similar to that used in cameras. The effect of the pin hole cover produces suitable pulse transitions for bar code decoding.

In other embodiments, scanning port 1140 includes other types of bar code scanners, such as a laser scanner. Other embodiments of gaming device 1000 include other types of code readers, depending on the physical embodiment of the code. One such code reader is a radio frequency sensor for use with RFID labels.

Figure 12:
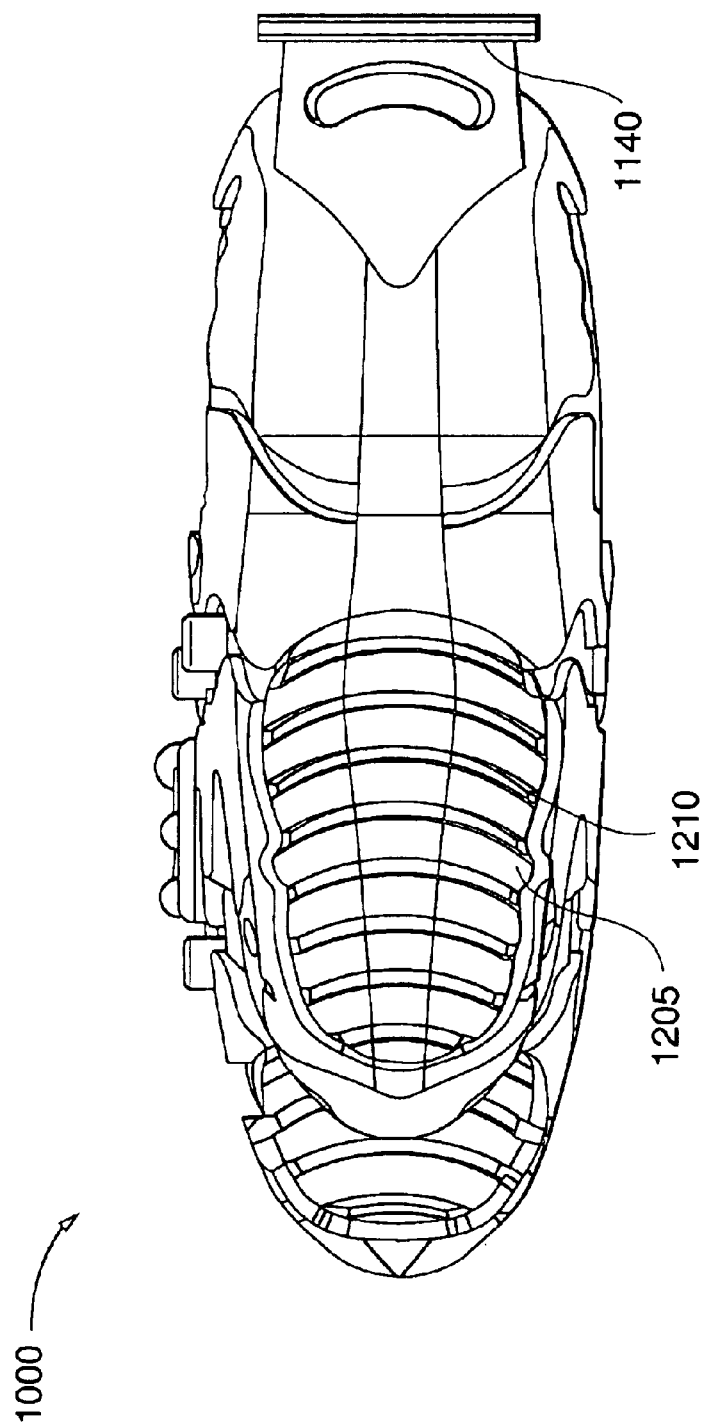
FIG. 12 is a side view of the second embodiment of a gaming device according to the present invention.

FIG. 12 is a side view of gaming device 1000. In this view, scanning port 1140 is on the right side and the controls described with reference to FIG. 10 are on top. FIG. 12 illustrates grips 1205, which include ribbed portions 1210 to allow a user to more securely grip gaming device 1000. In some preferred embodiments, grips 1205 are coated with rubber or a similar material to provide a comfortable and secure hold. In some embodiments, grips 1205 are colored differently from the body of gaming device 1000.

IV. Codes

According to preferred embodiments of the present invention, a code which is input to a gaming device has a primary meaning and the gaming device assigns a secondary meaning to at least a portion of this code. The secondary meaning relates to a feature of a game.

According to many embodiments of the present invention, the code is a bar code authorized by the Uniform Code Council ("UCC") and the primary meaning of the code is the identification of a company and a commercial product sold by the company. As will be appreciated by those of skill in the art, a company may obtain an unique company identification number from the UCC. The company may then assign unique product identification codes to each of its products. The company identification number and product identification code form the main portions of the well-known Uniform Product Code ("UPC") affixed to most products sold in the United States.

Figure 13:
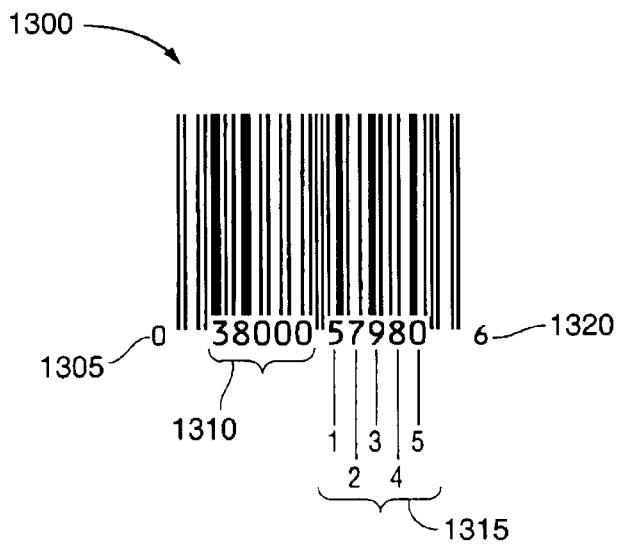
FIG. 13 illustrates the correlation between a UPC code for an arbitrary product, monster data and item data according to one embodiment of the present invention.

FIG. 13 illustrates one method of correlating a UPC code to a feature of a game. First, the primary meaning of the UPC code will be described. Code 1300 is only one variety of UPC code, commonly known as UPC version A. Digit 1305 is a UPC number system digit which indicates the type of product in general terms (0 for groceries, 3 for drugs, etc.). UPC manufacturer's code 1310 is assigned by the UCC to the manufacturer of the product, as described above. Product code 1315, comprising UPC item numbers 1 through 5, identifies the specific product to which the UPC code is attached. Check digit 1320, also known as a "modulo check sum digit," is used to help verify that the UPC code has been properly scanned.

In some embodiments of the present invention, a secondary meaning is assigned to UPC item numbers 1 through 5. In one such embodiment, the secondary meaning involves a correspondence between UPC item numbers 1 through 5 and features of the SKANNERZ™ game described above. If UPC item number 1 is in the range of 0 through 5, the code corresponds to a monster of the SKANNERZ™ game. If UPC item number 1 is in the range of 6 through 9, the code corresponds to an item of the SKANNERZ™ game.

According to one preferred embodiment, the type of monster or item number will be determined by UPC item numbers 3, 4 and 5. One method of encoding these monsters is to divide the numbers available in this range by the total number of monsters, then divide the remainder as needed.

For example, in the case discussed above there are 42 monsters in each tribe and 126 monsters in all. Three UPC item numbers have been allocated for encoding monster types, which means numbers 000 through 999 may be used, providing a total of 1,000 numbers. One thousand divided by 126 equals 7.94. Therefore, increments of 7 numbers can be used for encoding these 126 monsters. The range of numbers from 000 to 007 would correspond to the first monster in Tribe 1, 008 to 015 would correspond to the first monster in Tribe 2 and so on. Because 1,000 is not a multiple of 126, the last 2 monsters each have a range of 4 numbers. In other words, the last monster in Tribe 2 would correspond to the range of numbers 992 through 995 and the last monster in Tribe 3 would correspond to the range of numbers 996 through 999.

Similarly, in some embodiments the 25 items described with reference to FIG. 5 are defined by the range of numbers from 000 through 999. One thousand divided by 25 equals 40. Therefore, a range of 40 numbers can be used to define each item. In one embodiment, item I1 corresponds to the range of numbers from 000 through 039, item I2 corresponds to the range of numbers from 040 through 079, and so on.

The embodiment described above is merely one example of embodiments which correlate code numbers (here, ranges of code numbers) with a particular game feature. Other embodiments correlate different portions of a UPC bar code, or the entire bar code, with game features.

Still other embodiments input at least a portion of other types of UPC codes and assign the portion to a feature of a game. For example, other embodiments input at least a portion of a UPC version B, C or D code. UPC version B, which is used for some drugs and health related items, includes 11 digits plus a product type code, but does not include a check digit. UPC version C is structured substantially the same as version A. UPC version D is a variable-length code. Version D includes at least 12 digits, including a product type code, 10 information-carrying digits and a modulo check sum digit, followed by a variable number of digits.

Other embodiments of the present invention input other types of Global Trade Item Number ("GTIN") codes, including European Article Numbering ("EAN") or Japanese Article Numbering ("JAN") codes. EAN codes are very similar to UPC codes, but include 1 or 2 additional digits which indicate the country which issued the number. JAN codes employ the EAN format, except that the 2-digit country code does not vary. Both the UPC and EAN codes have shorter, 8-digit versions.

Many other encoding techniques are within the scope of the present invention. In some such embodiments, Global Location Number ("GLN") codes and similar codes used, e.g., for identifying parcels, are assigned secondary meanings which correspond with elements of a game. In still other embodiments, codes used for entirely different purposes, for example, audio or video data compression, data encryption, etc., are assigned secondary meanings which correspond with elements of a game.

Some embodiments or the present invention input code numbers to an algorithm which determines a correlation with a game feature. For example, some embodiments of gaming devices according to the present invention add some or all of the numbers of a code and correlate the sum with a game feature. Other embodiments perform other mathematical operations on part or all of a code and correlate the result with a game feature. Still other embodiments determine a corresponding game feature depending on the positions of certain digits. It is apparent that many of these techniques do not result in an unique outcome. For example, various combinations of code numbers will add up to the same number.

Although the preferred embodiments have been described in terms of games, codes and gaming devices for collecting characters and staging battles between them, various other applications are within the scope of the present invention. In one such embodiment, a gaming device is configured to scan bar codes (or to input similar codes stored on RS chips) and stage a treasure hunting game. Instead of corresponding with monsters or monster items, the controller can be configured to translate a code having a different primary meaning into a different type of secondary meaning, such as an item of treasure.

While the best mode for practicing the invention has been described in detail, those of skill in the art will recognize that there are numerous alternative designs, embodiments, modifications and applied examples which are within the scope of the present invention. Accordingly, the scope of this invention is not limited to the previously described embodiments.

We claim:

1. A gaming program stored in a storage medium of a gaming device for executing a game, wherein the gaming program controls the gaming device to perform the steps of:
   accepting at least a portion of a Universal Product Code, wherein said Universal Product Code corresponds to a product code pre-assigned in accordance with a set of Uniform Code Council requirements, said product code corresponding to a product, wherein said product is not a game associated product; and
   assigning a secondary meaning to the portion of the Universal Product Code, wherein said secondary meaning is unrelated to said product, wherein said secondary meaning is not assigned in accordance with said set of Uniform Code Council requirements, the secondary meaning corresponding to a feature of said game.

2. The gaming program of claim 1, further comprising the step of processing the feature according to a set of rules for the game.

3. The gaming program of claim 2, wherein the processing step further comprises the step of storing the feature in the storage medium within the gaming device.

4. The gaming program of claim 2, wherein the feature is a game character and the processing steep further comprises the step of conducting a battle between the game character and an adversarial game character.

5. The gaming program of claim 2, wherein the game feature is an item of treasure, wherein the game is a treasure hunt and wherein the processing step further comprises the step of determining if the item of treasure is needed in order to complete the treasure hunt.

6. The gaming program of claim 2, wherein the game feature is a monster belonging to one of a plurality of tribes and wherein the processing step further comprises the step of determining whether the monster belongs to a specific tribe of said plurality of tribes, the specific tribe associated with the game.

7. The gaming program of claim 1, wherein the accepting step further comprises the step of controlling a sensor to input the portion of the Universal Product Code.

8. The gaming program of claim 1, wherein the portion of the Universal Product Code corresponds to an item number.

9. The gaming program of claim 1, wherein the portion of the Universal Product Code corresponds to a manufacturer identification number.

10. The gaming program of claim 1, wherein the assigning step further comprises the step of obtaining the secondary meaning from a look-up table.

11. The gaming program of claim 1, wherein the assigning step further comprises the steps of:
    applying an algorithm to the portion of the Universal Product Code to produce a result, wherein the result corresponds to the secondary meaning; and
    correlating the secondary meaning with the feature of the game.

12. A gaming program stored in a storage medium of a gaming device, wherein the gaming program controls the gaming device for executing a game, the gaming program performing the steps of:
    obtaining a portion of a product code, said product code associated with a product, wherein said product is not a game associated product,
    applying a set of code correlation rules to said portion of said product code to establish a secondary meaning corresponding to said portion of said product code, wherein said secondary meaning is unrelated to said product;
    correlating a game character with said secondary meaning; and
    staging a battle involving the game character according to a pre-defined set of game rules stored within the gaming device.

13. The gaming program of claim 12, further comprising the step of identifying the game character as a first monster of a first plurality of monsters, wherein the battle is between the first monster and a second monster associated with a second plurality of monsters.

14. The gaming program of claim 12, wherein said product code is a Global Trade Input Number code.

15. The gaming program of claim 12, wherein said product code is a European Article Numbering code.

16. The gaming program of claim 12, wherein said product code is a Japanese Article Numbering code.

17. The gaming program of claim 12, wherein said product code is a Global Location Number code.

18. A method of playing a game, comprising the steps of:
    using a sensor of a gaming device to input at least a portion of a Universal Product Code, wherein said Universal Product Code corresponds to a product code pre-assigned in accordance with a set of Uniform Code Council requirements, said product code corresponding to a product, wherein said product is not a game associated product;
    automatically determining a secondary meaning for the input portion of the Universal Product Code, wherein said secondary meaning is unrelated to said product, wherein said secondary meaning is not assigned in accordance with said set of Uniform Code Council requirements, the secondary meaning corresponding to a game feature, wherein said automatic determining step is performed by said gaming device;
    automatically determining whether the game feature is a compatible game feature, wherein said compatible game feature is associated with said gaming device, wherein said automatic determining step is performed by said gaming device; and
    automatically storing the game feature if the game feature is determined to be a compatible game feature, wherein said automatic storing step is performed by said gaming device.

19. The method of claim 18, wherein the game feature is a game character.

20. The method of claim 18, wherein the game feature is a monster belonging to a tribe associated with the gaming device.

21. The method of claim 18, wherein the game feature is an item which alters an attribute of a game character.

22. The method of claim 18, wherein the game feature is an item of treasure.

23. The method of claim 18, further comprising the steps of:

automatically determining whether the game feature is an incompatible game feature, wherein said compatible game feature is not associated with said gaming device, wherein said automatic determining step is performed by said gaming device; and initiating a contest between the incompatible game feature and a stored compatible game feature.

24. The method of claim 23, further comprising the step of selecting an offensive monster, wherein the offensive monster is used in the contest.

25. The method of claim 23, further comprising the step of selecting one of a plurality of stored game features, wherein the selected game feature is used in the contest.

26. The method of claim 23, further comprising the step of selecting a stored item, wherein the stored item impacts the contest.

27. The method of claim 18, wherein said step of using a sensor is further comprised of optically scanning a bar code, said bar code corresponding to said portion of said Universal Product Code.

* * * * *